(12) United States Patent
Alber (10) Patent No.: US 6,945,584 B1
(45) Date of Patent: Sep. 20, 2005

(54) TAILGATE ADVERTISING APPARATUS AND METHODS

(76) Inventor: Frank R. Alber, 2947 N. Carriage La., Chandler, AZ (US) 85224

( * ) Notice: Subject to any disclaimer, the term of this patent is extended or adjusted under 35 U.S.C. 154(b) by 0 days.

(21) Appl. No.: 10/934,238

(22) Filed: Sep. 3, 2004

Related U.S. Application Data (63) Continuation of application No. 10/418,346, filed on Apr. 18, 2003, now Pat. No. 6,789,833.

(51) Int. Cl.[7] .......................................... B60R 13/00
(52) U.S. Cl. ..................... 296/57.1; 296/21; 292/125; 292/225
(58) Field of Search ................... 296/57.1, 21, 136.01, 296/136.07, 136.1; 40/591, 590, 643, 644, 40/209; 292/336.3, 125, 225, DIG. 25, DIG. 63

(56) References Cited

U.S. PATENT DOCUMENTS

| | | | | |
|---|---|---|---|---|
| 194,333 A | * | 8/1877 | Cole | 292/122 |
| 197,115 A | * | 11/1877 | Frees | 292/28 |
| 206,713 A | * | 8/1878 | Fernandez | 292/125 |
| 986,084 A | * | 3/1911 | Petrovics | 292/132 |
| 1,374,053 A | * | 4/1921 | Brawner, Jr. | 292/225 |
| 1,596,324 A | * | 8/1926 | Trood | 292/125 |
| 1,628,506 A | * | 5/1927 | Lyman | 251/80 |
| 2,620,579 A | * | 12/1952 | Dienes | 40/591 |
| 2,912,279 A | * | 11/1959 | Hawkins | 292/336.3 |
| 3,054,634 A | * | 9/1962 | Westerdale | 292/336.3 |
| 3,461,584 A | * | 8/1969 | Wilson | 40/591 |
| 3,802,103 A | * | 4/1974 | Neff | 40/591 |
| 5,255,464 A | * | 10/1993 | Marecek | 40/591 |
| 5,358,292 A | * | 10/1994 | Van Wiebe et al. | 292/235 |
| 6,050,619 A | * | 4/2000 | Arabia et al. | 292/216 |
| 6,135,514 A | * | 10/2000 | Kowalewski et al. | 292/216 |
| 6,192,725 B1 | * | 2/2001 | Watson et al. | 70/208 |
| 6,209,933 B1 | * | 4/2001 | Ang et al. | 292/336.3 |
| 6,247,742 B1 | * | 6/2001 | Boudreaux | 296/57.1 |
| 6,367,181 B1 | * | 4/2002 | Skoog | 40/591 |
| 6,776,554 B2 | * | 8/2004 | Acciacca | 403/353 |
| 6,789,833 B1 | * | 9/2004 | Alber | 296/57.1 |
| 2005/0057050 A1 | * | 3/2005 | Saitoh et al. | 292/336.3 |

* cited by examiner

*Primary Examiner*—H. Gutman
(74) *Attorney, Agent, or Firm*—Parsons & Goltry; Michael W. Goltry; Robert A. Parsons (57) ABSTRACT

A tailgate advertising assembly includes a tailgate and a billboard. The tailgate is for attachment to a rear of a vehicle so as to be moved between a closed position and an open position as for loading and unloading, and has an upper extremity, a lower extremity, opposing side extremities, an inner face, and an outer face. The billboard is engaged to the tailgate, and overlies the outer face of the tailgate. The billboard supports advertising indicia.

9 Claims, 7 Drawing Sheets

TAILGATE ADVERTISING APPARATUS AND METHODS

CROSS-REFERENCE TO RELATED APPLICATIONS

This application is a continuation of U.S. patent application Ser. No. 10/418,346, filed 18 Apr. 2003 now U.S. Pat. No. 6,789,833.

FIELD OF THE INVENTION

This invention relates to advertising systems and methods.

BACKGROUND OF THE INVENTION

To advertise is to make something known for the purpose of arousing the desire to buy or patronize goods or services. The key ingredient for effective advertising is matching an appropriate target audience with specific goods or services. Not every audience will buy or patronize every good or service. Accordingly, having an understanding of the demographics, culture, needs and social-economic base of a given audience can mark the difference between effective and ineffective advertising.

Most advertising incorporates press, magazine, billboard, radio and television exposure, which together comprise traditional advertising channels. Most business concerns, both large and small, usually budget advertising expenses to include one or more of the traditional advertising channels. Advertising is an investment. However, business owners often invest little attention toward identifying a potentially quantifiable return on advertising expenditures. This is likely due to the fact that it is difficult, if not impossible, to quantify a return from an investment into traditional advertising channels. In view of these and other deficiencies in the art of advertising, the need for certain new and useful improvements in the field of advertising is evident.

SUMMARY OF THE INVENTION

The above problems and others are at least partially solved and the above purposes and others realized in a tailgate advertising assembly including a tailgate and an attached billboard. The tailgate is for attachment to a rear of a vehicle so as to be moved between a closed position and an open position as for loading and unloading. The tailgate has an upper extremity, a lower extremity, opposing side extremities, an inner face, and an outer face. The billboard is attached to, and overlies the outer face of, the tailgate. The billboard consists of a media insert disposed between a backing and a cover, in which the backing is substantially rigid and the cover is transparent permitting the media insert to be viewed therethrough. The backing and the cover are substantially coextensive defining a perimeter having a frame attached thereto. Engagement structures are attached to the tailgate, which secure the billboard to the tailgate. In a particular embodiment, the engagement structures consist of a first engagement structure and a second engagement structure. The first engagement structure, in this particular embodiment, is a fixture having a proximal extremity engaged to the upper extremity of the tailgate and a distal extremity engaged to the billboard. Further to this embodiment, the second engagement structure consists of at least one bracket having a proximal extremity engaged to the lower extremity of the tailgate and a distal extremity engaged to the billboard. A tailgate latch handle is pivoted to the tailgate, and a fixture handle is pivoted to the fixture. The fixture handle is coupled to the tailgate latch handle, in which the tailgate latch handle pivots in response to pivoting of the fixture handle, permitting the tailgate to be opened and closed. Preferably, a cord functions to couple the fixture handle to the tailgate latch handle, the cord having an end engaged to the fixture handle and an opposing end engaged to the tailgate latch handle. A portion of the cord intermediate the ends thereof is threaded over at least one attached pulley. In a particular embodiment, the billboard overlies substantially all of the outer face of the tailgate. It is to be understood that the billboard can be sized for overlying a selected portion of the outer face of the tailgate. In still a further embodiment, there is a pole having a proximal end engaged to the fixture and a distal end having a flag attached thereto.

Another apparatus consists of a tailgate advertising assembly including a tailgate, first engagement structure, second engagement structure and a billboard. In this embodiment, the tailgate is for attachment to a rear of a vehicle so as to be moved between a closed position and an open position as for loading and unloading, in which the tailgate has an upper extremity, a lower extremity, opposing side extremities, an inner face, and an outer face. The first engagement structure is attached to the upper extremity of the tailgate, the second engagement structure is attached to the lower extremity of the tailgate, and the billboard, secured by the first engagement structure and the second engagement structure, overlies the outer face of the tailgate. The billboard consists of a media insert disposed between a backing and a cover, in which the backing is substantially rigid and the cover is transparent permitting the media insert to be viewed therethrough. The backing and the cover are substantially coextensive defining a perimeter having a frame attached thereto. The first engagement structure is a fixture having a proximal extremity engaged to the upper extremity of the tailgate and a distal extremity engaged to the billboard. The second engagement structure consists of at least one bracket having a proximal extremity engaged to the lower extremity of the tailgate and a distal extremity engaged to the billboard. A tailgate latch handle is pivoted to the tailgate, and a fixture handle is pivoted to the fixture. The fixture handle is coupled to the tailgate latch handle, in which the tailgate latch handle pivots in response to pivoting of the fixture handle, permitting the tailgate to be opened and closed. Preferably, a cord functions to couple the fixture handle to the tailgate latch handle, the cord having an end engaged to the fixture handle and an opposing end engaged to the tailgate latch handle. A portion of the cord intermediate the ends thereof is threaded over at least one attached pulley. In a particular embodiment, the billboard overlies substantially all of the outer face of the tailgate. It is to be understood that the billboard can be sized for overlying a selected portion of the outer face of the tailgate. In still a further embodiment, there is a pole having a proximal end engaged to the fixture and a distal end having a flag attached thereto.

Yet another apparatus embodiment consists of a tailgate advertising assembly including a tailgate furnished with a tailgate latch handle, a fixture, engagement structure, a billboard and a fixture handle. The tailgate is for attachment to a rear of a vehicle so as to be moved between a closed position and an open position as for loading and unloading, in which the tailgate having an upper extremity, a lower extremity, opposing side extremities, an inner face, an outer face, and the tailgate latch handle, which is pivoted to the tailgate. The fixture is attached to the upper extremity of the tailgate, the engagement structure is attached to the lower extremity of the tailgate, and the billboard, secured by the fixture and the engagement structure, overlies the outer face of the tailgate. The fixture handle is pivoted to the fixture, and the fixture handle is coupled to the tailgate latch handle, in which the tailgate latch handle pivots in response to pivoting of the fixture handle. Preferably, a cord functions to couple the fixture handle to the tailgate latch handle, the cord having an end engaged to the fixture handle and an opposing end engaged to the tailgate latch handle. A portion of the cord intermediate the ends thereof is threaded over at least one attached pulley. The billboard consists of a media insert disposed between a backing and a cover, in which the backing is substantially rigid and the cover is transparent permitting the media insert to be viewed therethrough. The backing and the cover are substantially coextensive defining a perimeter having a frame attached thereto. The fixture has a proximal extremity engaged to the upper extremity of the tailgate and a distal extremity engaged to the billboard. The engagement structure consists of at least one bracket having a proximal extremity engaged to the lower extremity of the tailgate and a distal extremity engaged to the billboard. In a particular embodiment, the billboard overlies substantially all of the outer face of the tailgate. It is to be understood that the billboard can be sized for overlying a selected portion of the outer face of the tailgate. In still a further embodiment, there is a pole having a proximal end engaged to the fixture and a distal end having a flag attached thereto.

Yet still another apparatus embodiment consists of a tailgate advertising assembly including a tailgate for attachment to a rear of a vehicle so as to be moved between a closed position and an open position as for loading and unloading, the tailgate having an upper extremity, a lower extremity, opposing side extremities, an inner face, and an outer face. Further to this embodiment is a fixture having a proximal extremity engaged to and overlying the upper extremity of the tailgate and a distal extremity projecting outboard of the outer face of the tailgate, and at least one bracket having a proximal extremity engaged to the lower extremity of the tailgate and a distal extremity projecting outboard of the outer face of the tailgate. A billboard, having an upper extremity engaged to the distal extremity of the fixture and a lower extremity engaged to the distal extremity of the bracket, overlies the outer face of the tailgate. A tailgate latch handle is pivoted to the tailgate, a fixture handle is pivoted to the fixture, and the fixture handle is coupled to the tailgate latch handle, in which the tailgate latch handle pivots in response to pivoting of the fixture handle. Preferably, a cord functions to couple the fixture handle to the tailgate latch handle, the cord having an end engaged to the fixture handle and an opposing end engaged to the tailgate latch handle. A portion of the cord intermediate the ends thereof is threaded over at least one attached pulley. The billboard consists of a media insert disposed between a backing and a cover, in which the backing is substantially rigid and the cover is transparent permitting the media insert to be viewed therethrough. The backing and the cover are substantially coextensive defining a perimeter having a frame attached thereto. In a particular embodiment, the billboard overlies substantially all of the outer face of the tailgate. It is to be understood that the billboard can be sized for overlying a selected portion of the outer face of the tailgate. In still a further embodiment, there is a pole having a proximal end engaged to the fixture and a distal end having a flag attached thereto.

A further embodiment of the invention consists of an advertising assembly for a tailgate for attachment to a rear of a vehicle so as to be moved between a closed position and an open position as for loading and unloading, the tailgate having an upper extremity, a lower extremity, opposing side extremities, an inner face, an outer face, and a pivotally attached tailgate latch handle. The advertising assembly in this embodiment, includes a fixture having a proximal extremity adapted to overly and to be removably engaged to the upper extremity of the tailgate, engagement structure adapted to be removably engaged to the lower extremity of the tailgate, and a billboard having an upper extremity adapted to be removably engaged to the fixture and a lower extremity adapted to be removably engaged to the engagement structure, disposing the billboard so as to overly the outer face of the tailgate. A fixture handle is pivoted to the fixture. A cord is provided having an end engaged to the fixture handle and an opposing second end adapted to be removably engaged to the tailgate latch handle. A portion of the cord between its ends is adapted to be threaded over at least one pulley attached to the fixture. The billboard consists of a media insert disposed between a backing and a cover, in which the backing is substantially rigid and the cover is transparent permitting the media insert to be viewed therethrough. The backing and the cover are substantially coextensive defining a perimeter having a frame attached thereto. The engagement structure consists of at least one bracket having a proximal extremity adapted to be removably engaged to the lower extremity of the tailgate and a distal extremity adapted to be removably engaged to the lower extremity of the billboard. A pole has a proximal end adapted to be removably engaged to the fixture and a distal end having a flag attached thereto.

Consistent with the foregoing and the ensuing specification, which are taken together, the invention contemplates associated apparatus and method embodiments.

BRIEF DESCRIPTION OF THE DRAWINGS

Referring to the drawings.

DETAILED DESCRIPTION OF A PREFERRED EMBODIMENT

Figures 1, 5:
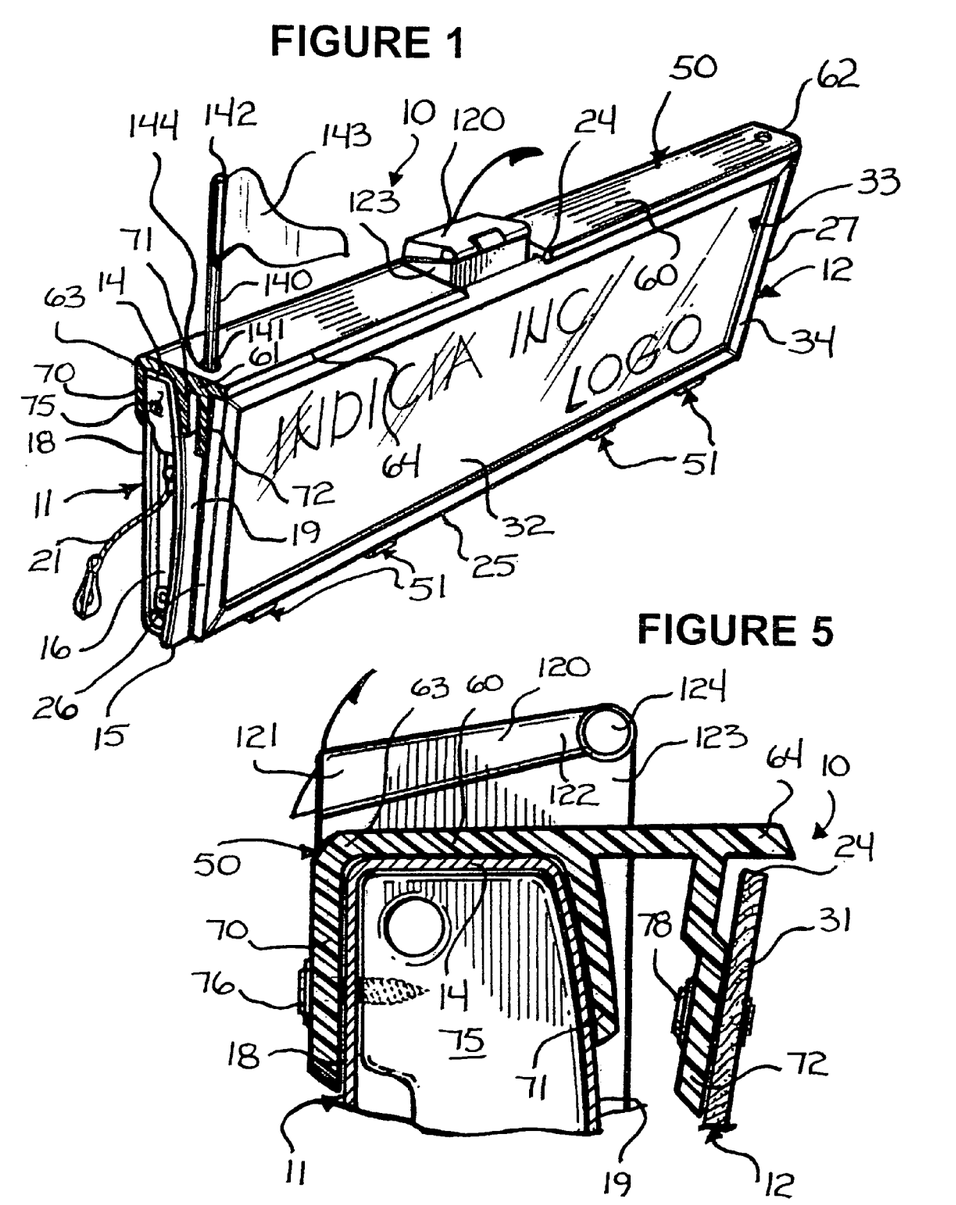
FIG. 1 is a perspective view of a tailgate advertising assembly including a fixture and brackets securing a billboard to a tailgate for attachment to a rear of a vehicle, in accordance with the principle of the invention.
FIG. 5 is an enlarged, vertical sectional view of the assembly of FIG. 1, illustrating the attachment of the fixture to the tailgate.

Turning now to the drawings, in which like reference characters indicate corresponding elements throughout the several views, attention is first directed to FIG. 1 in which is seen a tailgate advertising assembly, embodying the principle of the instant invention, generally indicated by the reference character 10 including a tailgate 11 and a billboard 12 attached thereto. Tailgate 11 is for attachment to a rear of a vehicle so as to be moved between a closed position closing a storage area and an open position opening a storage area as for loading and unloading. Tailgate 11 is rectangular in shape, and has an upper extremity 14 (FIGS. 1–5), a lower extremity 15 (FIGS. 1, 3, 4, and 6), a side extremity 16 (FIGS. 1, 3, and 4) and an opposing side extremities 17 (FIG. 3), an inner face 18 (FIGS. 1, and 4–6), an opposing outer face 19 (FIGS. 1, 2, and 4–6), and a tailgate latch handle 20 (FIG. 2).

Figure 2:
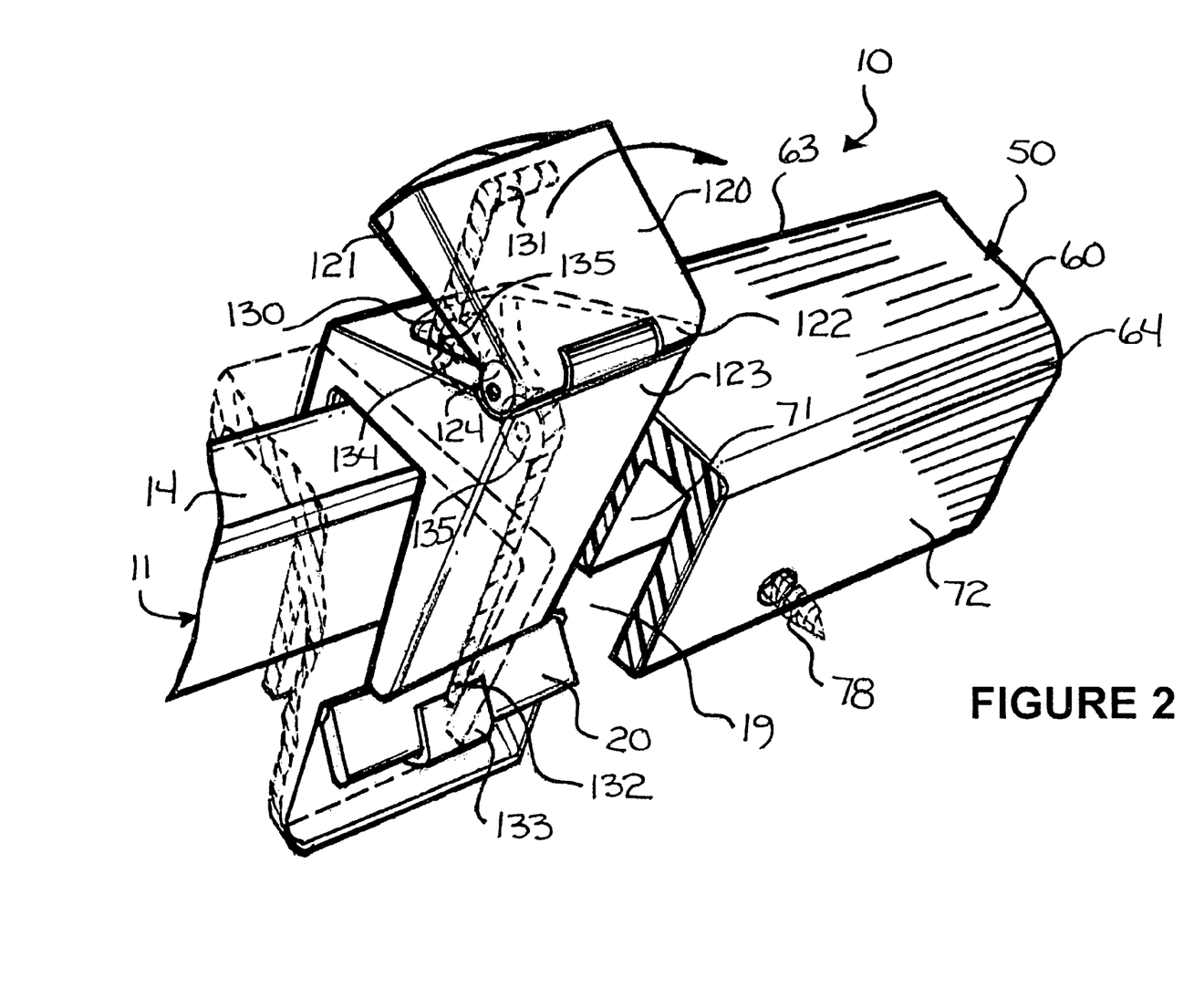
FIG. 2 is enlarged fragmented perspective view of the assembly of FIG. 1, illustrating a fixture handle coupled to a tailgate latch handle with an attachment element.
Figure 3:
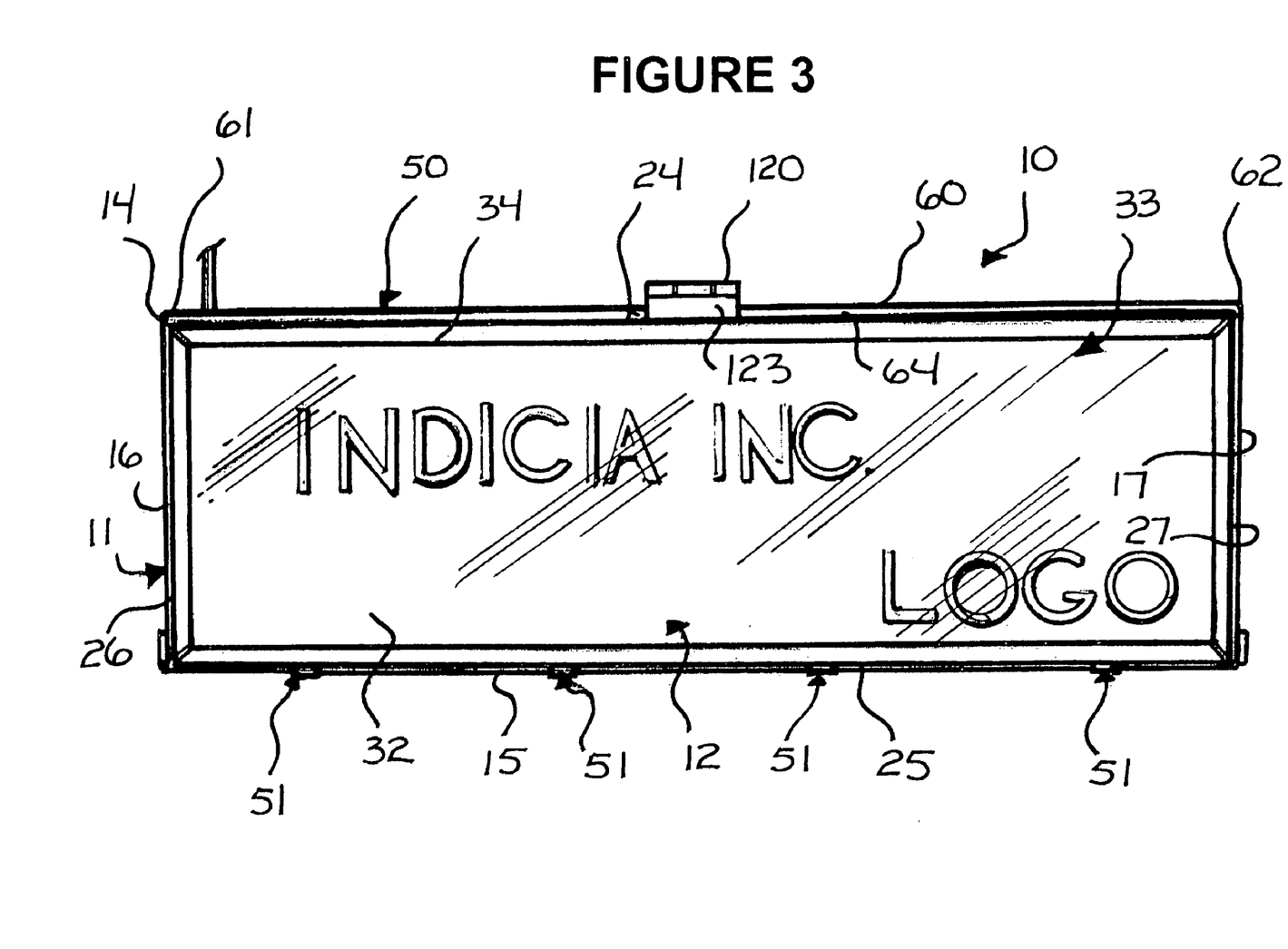
FIG. 3 is a front elevational view of the assembly of FIG. 1.

Referring to FIG. 2, tailgate latch handle 20 is pivoted to tailgate 11 intermediate side extremities 16, 17 (not shown in FIG. 2) proximate upper extremity 14, and is disposed at outer face 19, although it can be disposed at inner face 18, if desired. Tailgate latch handle 20 is pivoted to tailgate 11 in a conventional manner, and functions to operate a corresponding latch mechanism for securing tailgate 11 in its closed position so as to enclose a storage area and disengaging tailgate 11 from its closed position permitting it to be opened for gaining access to a storage area. This is a conventional and well-known arrangement. Looking to FIG. 1, a tailgate cable 21 is secured to side extremity 16 of tailgate 11 in a conventional manner, which is used to help secure tailgate 11 to a vehicle in a conventional manner. Although not shown, a similar tailgate cable is provided with side extremity 17. In a typical installation, tailgate 11 is mounted to the rear of a vehicle for pivotal movement at its lower extremity 15, and is capable of being pivoted between a closed position closing a storage area at the rear of the vehicle and an open positioning opening the storage area at the rear of the vehicle. Vehicles including tailgates, such as tailgate 11, include pickup trucks, sport utility vehicles, etc. Tailgate 11 can be pivoted at either of its side extremities 16, 17, if desired, and this manner of attachment is employed with the tailgates many different types of recreational vehicles.

Set forth for purposes of orientation and reference in connection with the ensuing detailed description of the preferred embodiment of the instant invention, the foregoing brief description of tailgate 11 is intended to be generally representative of a typical tailgate for attachment to a rear of a vehicle so as to be moved between a closed position closing a storage area, such as the bed of pickup or the interior of a vehicle, and an open position opening a storage area as for loading and unloading. Details not specifically illustrated and described will be readily understood and appreciated by those skilled in the art.

Referring to FIG. 1, billboard 12 is attached to, and overlies outer face 19 of, tailgate 11, and is for use in supporting advertisement indicia for the purpose of conveying an advertising message to onlookers. Like tailgate 11, billboard 12 is generally rectangular in shape, and defines opposing upper and lower ends or extremities 24, 25, and opposing side ends or extremities 26, 27. In the immediate embodiment, billboard 12 is substantially coextensive with tailgate 11 and overlies or otherwise confronts substantially all of the surface area of outer face 19 of tailgate 11, in which upper extremity 24 of billboard 12 is disposed adjacent and alongside upper extremity 14 of tailgate 11, lower extremity 25 of billboard 12 is disposed adjacent and alongside lower extremity 15 of tailgate 11, side extremity 26 of billboard 12 is disposed adjacent and alongside side extremity 16 of tailgate 11, and side extremity 27 of billboard 12 is disposed adjacent and alongside side extremity 17 of tailgate 11, and this aspect is readily depicted in FIG. 3. It is to be understood that billboard 12 can be sized for overlying or otherwise confronting a selected portion of the outer face of the tailgate, such as substantially the entire surface area of outer face 19, approximately half of the surface area of outer face 19, less than half the surface area of outer face 19, etc. Billboard 12 is designed to carry advertising for conveying a selecting advertising message to onlookers.

Figures 9, 10:
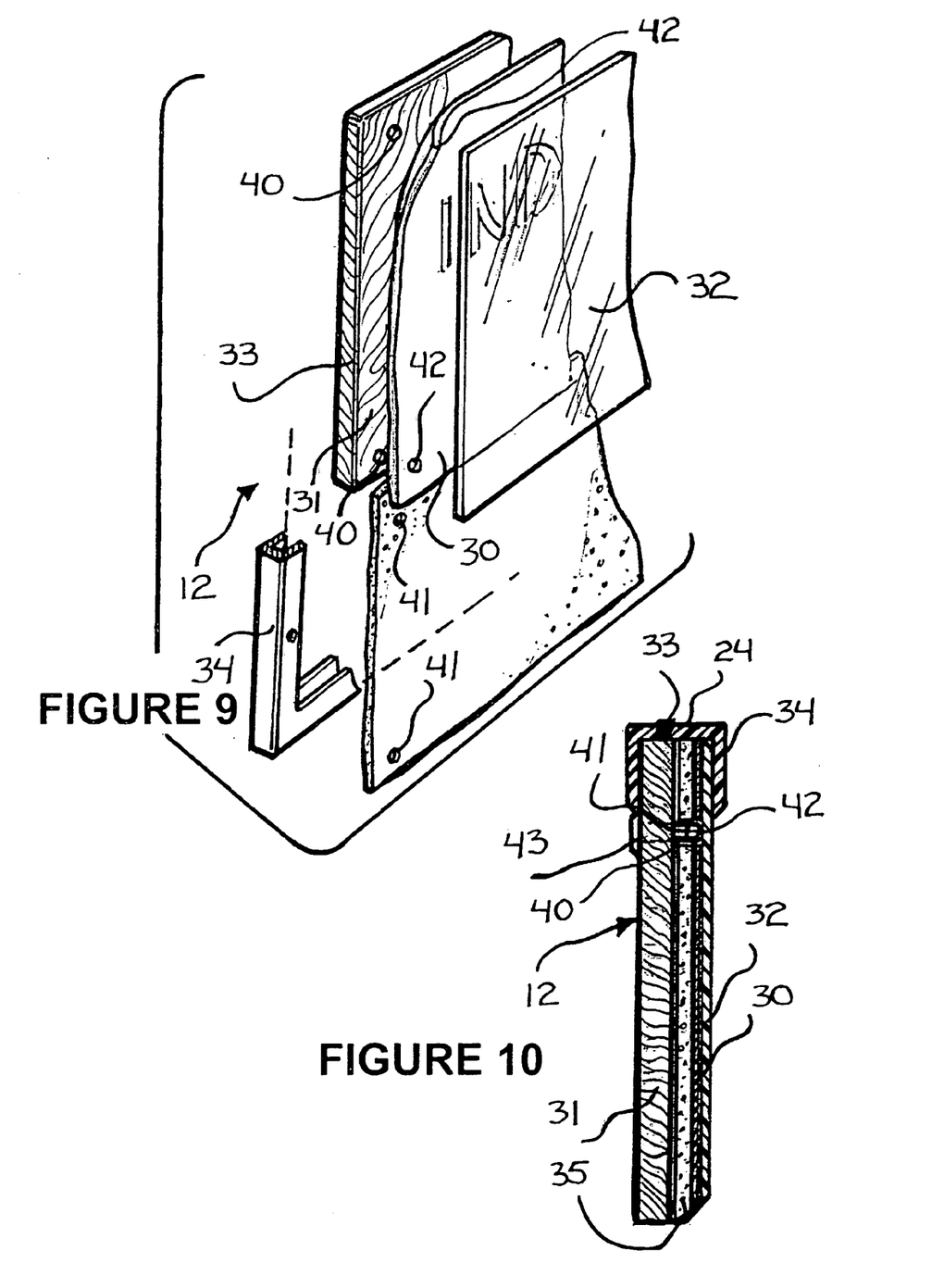
FIG. 9 is a fragmented exploded view of the billboard of FIG. 1.
FIG. 10 is a fragmented vertical sectional view of the billboard of the assembly of FIG. 1.

Turning to FIG. 9, billboard 12 is an assembly, which consists of a media insert 30 disposed between a backing 31 and a cover 32, in which backing 31 is substantially rigid and cover 32 is transparent permitting media insert 30 to be viewed therethrough. Backing 31 is fashioned of wood, plastic, metal or other substantially rigid material or combination of materials, as is either integrally formed or fashioned as an assembly of two or more parts. Cover 32 is fashioned of transparent plastic, but it can be fashioned of transparent glass or other transparent material or combination of materials. Like backing 31, cover 32 can be integrally formed or fashioned as an assembly of two or more parts.

Backing 31 and cover 32 are flat, sheet-like elements, and are substantially coextensive and together define a perimeter of billboard 12, generally denoted at 33, which extends into and is coupled by a frame 34, which is continuous and extends along perimeter 33, much like a picture frame. Preferably, the attachment between frame 34 and perimeter 33 is substantially water-tight, inhibiting water from migrating into the billboard assembly. Backing 31 and cover 32 are secured by frame 34, in which media insert 30 is disposed therebetween and which supports advertising indicia that can be viewed through cover 32. Media insert is fashioned of paper, cardboard, plastic, etc., in which the advertising indicia is applied thereto in any desired manner, whether by way of printing, adhesive application, etc. In the immediate embodiment, media insert 30 is substantially coextensive with backing 31 and cover 32, although it can be of lesser size. If desired, billboard 12 can also incorporate a spacer insert 35 between media insert 30 and backing 31. Spacer insert 35 is constructed of corkboard or other similar material, and is preferably substantially coextensive with backing 31 and cover 32, although it can be of lesser size, if desired.

As seen in FIG. 9, backing 31 is fashioned with protrusions 40, which project outward therefrom and project through corresponding holes 41 through spacer insert 35 and corresponding holes 42 through media insert 30. Protrusions 40 function to hold spacer insert 35 and media insert 30 in place. In the immediate embodiment, protrusions 40 constitute the distal ends of pins, one of which is illustrated in FIG. 10 and denoted at 43, that project through backing 31. Protrusions 40 can be integrally formed with backing 31 or perhaps adhesively applied to backing 31. Those of ordinary skill will readily appreciate that protrusions 40 can be applied to backing 31 in other ways and with the use of any suitable attachment mechanism, such as with applied hook and loop fasteners, snap fasteners, threaded fasteners, etc. Although only two protrusions 40 are depicted in FIG. 9, this is only for illustrative purposes, and it is be understood that more protrusions can be used with billboard 12, if desired, at various spaced-apart locations.

Figure 4:
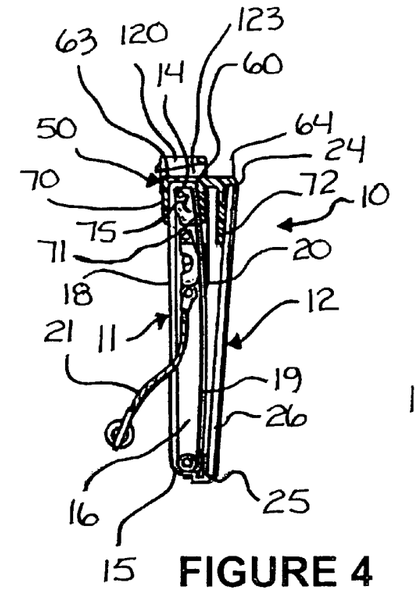
FIG. 4 is a side elevational view of the assembly of FIG. 1.

Turning back to the embodiment depicted in FIG. 1, assembly 10 incorporates a fixture 50 and brackets 51, which function to secure billboard 12 to tailgate 11, in accordance with the principle of the invention. As seen in FIG. 4, fixture 50 and brackets 51 hold billboard 12 away from outer face 19 of tailgate 11, which prevents billboard 12 from contacting outer face 19 and scratching it. And so billboard 12 is secured by fixture 50 and brackets 51, so as to be disposed alongside and overlying or otherwise confronting outer face 19 of tailgate 11 and held away from outer face of tailgate 11. Brackets 51 are disposed at spaced intervals. In the proper attachment of billboard 12, backing 31 faces outer face 19 of tailgate 11 and cover 32 projects outwardly, permitting onlookers to visualize therethrough and appreciate the advertisement indicia carried by media insert 30.

Fixture 50 is constructed of plastic, metal, metal composite or other substantially rigid material or combination of materials, and consists of an elongate body 60 having opposing ends 61, 62, a proximal extremity 63, and a distal extremity 64. In the immediate preferred embodiment, the length of fixture 50 from end 61 to end 62 is approximately equal to the length of tailgate 11 from side extremity 16 to side extremity 17. Depending on specific needs and on the length of billboard 12, the length of fixture 50 can be less than the length of tailgate 11. In the preferred embodiment disclosed herein, the length of fixture 50 is also approximately equal to the length of billboard 12 from its side end 26 to its other side end 27. The length of fixture 50 and the length of billboard 12 can be different, if desired.

Spaced-apart proximal, intermediate and distal endwalls 70, 71 and 72, respectively, are attached to and project downwardly from body 60, in which each extends from end 61 to end 62. Proximal endwall 70 is disposed at and projects downwardly from proximal extremity 63, distal endwall 72 is disposed at and projects downwardly from distal extremity 64, and intermediate endwall 71 projects downwardly from body 60 and is disposed between proximal and distal endwalls 70, 72. It is to be understood that proximal endwall 70 is disposed proximally and is considered part of, or otherwise an extension of, distal extremity 63. It will also be understood that distal endwall 72 is disposed distally and is considered part of, or otherwise an extension of, distal extremity 64.

Figure 8:
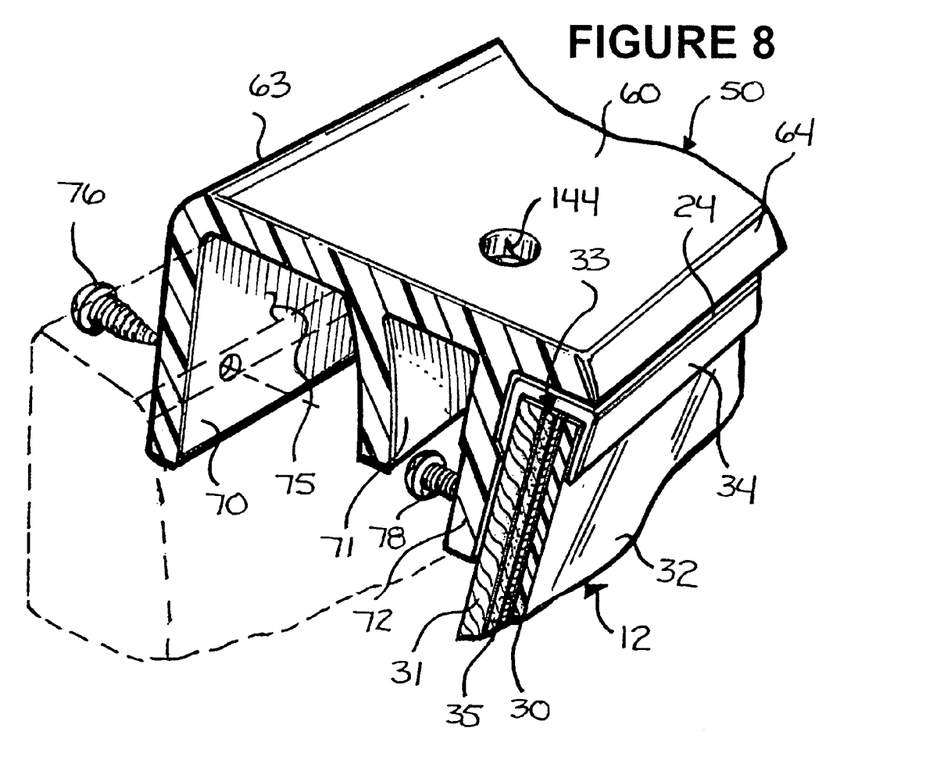
FIG. 8 is an enlarged fragmented view of the assembly of FIG. 1, illustrating the attachment of the billboard to the fixture, in which portions of the tailgate are shown in phantom outline for illustrative purposes.

Proximal and intermediate endwalls 70, 71 define a socket 75 therebetween. In the attachment of fixture 50 to tailgate 11, upper extremity 14 of tailgate 11 fits in socket 75, in which proximal endwall 70 is disposed alongside portions of inner face 18 of tailgate 11 adjacent upper extremity 14, and intermediate endwall 71 is disposed alongside portions of outer face 19 of tailgate 11 adjacent upper extremity 14. Fixture 50 is secured in place to tailgate 11 with fasteners, such as threaded fasteners like the one illustrated in FIGS. 5 and 8 and denoted at 76, although other fastener forms can be used such as rivets, sex bolts, etc. Welding can also be used, or adhesive attachment, if desired. In the immediate embodiment, threaded fasteners, such as threaded fastener 76, are employed at spaced intervals along the length of proximal endwall 70, securing proximal endwall 70 to inner face 18 of tailgate 11. Fasteners can be disposed elsewhere along fixture 50 so as to secure fixture 50 to tailgate 11, if desired. When fixture 50 is so installed with tailgate 11 and fit onto upper extremity 14 of tailgate 11, proximal extremity 63 is engaged to and overlies upper extremity 14 of tailgate 11 and distal extremity 64 and distal endwall 72 project outboard of outer face 19 of tailgate, and this arrangement is well illustrated in FIGS. 1, 4, and 5. Rather than using fasteners 76 to secure fixture 50 to tailgate 11, fixture 50 can be secured to tailgate 11 with one or more brackets, straps, etc.

Upper extremity 24 of billboard 12 is secured to distal endwall 72 of fixture 50. In the immediate embodiment, upper extremity 25 of billboard 12 is secured to distal endwall 72 with fasteners, such as threaded fasteners like the one illustrated in FIGS. 2, 5, and 8 and denoted at 78, although other fastener forms can be used such as rivets, sex bolts, etc. In the immediate embodiment, threaded fasteners, such as threaded fastener 78, are employed at spaced intervals along the length of distal endwall 72, securing distal endwall 72 to backing 31.

Figure 6:
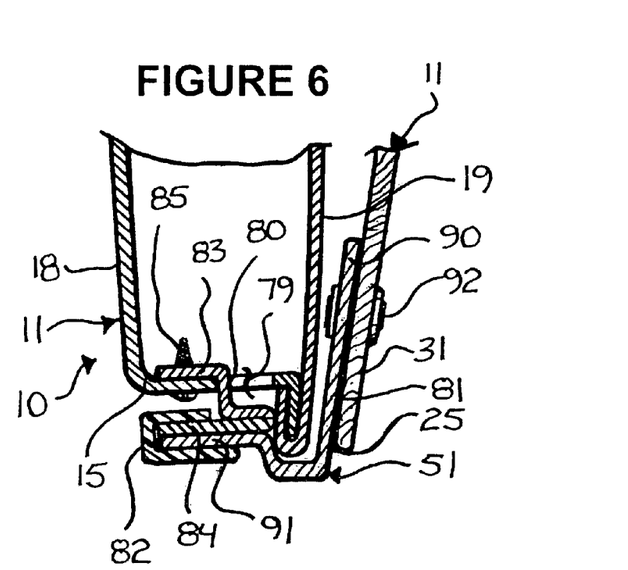
FIG. 6 is an enlarged, vertical sectional view of the assembly of FIG. 1, illustrating an embodiment of a bracket attaching a lower extremity of the billboard to the tailgate.

As with conventional tailgates, tailgate 11 is hollow and has drainage holes that lead to the interior of tailgate 11. One such drainage hole is shown in FIG. 6 and denoted at 79. Drainage holes are disposed at spaced intervals at lower extremity 15 along the length of tailgate 11 between ends 16, 17 (not shown in FIG. 6) thereof.

Figure 7:
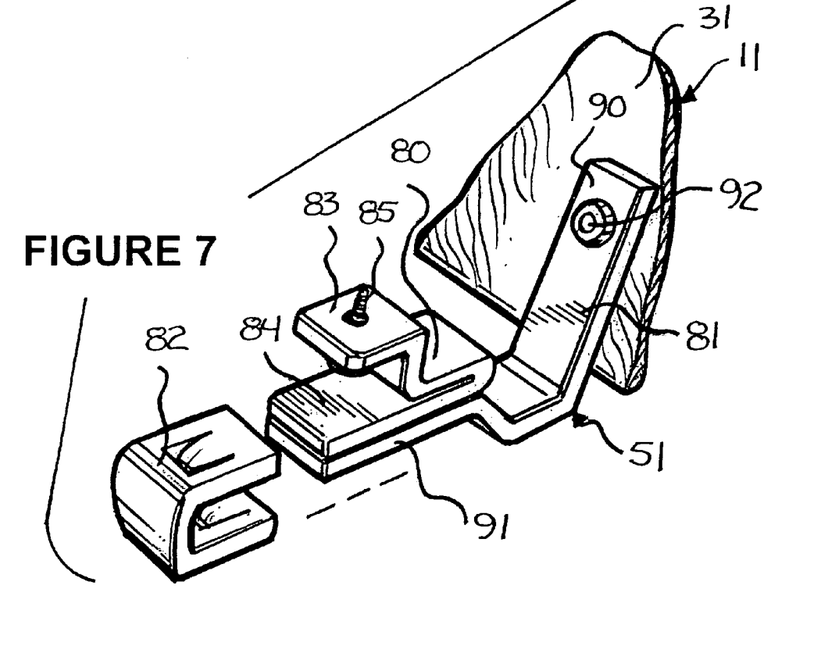
FIG. 7 is a partially exploded perspective view of the bracket embodiment of FIG. 6.

As previously mentioned, lower extremity of billboard 12 is secured to brackets 51 attached to lower extremity 15 of tailgate 11, one of which is illustrated in FIGS. 6 and 7. Bracket 51 is an assembly, which consists of a proximal bracket element 80, a distal bracket element 81, and a clip 82. Proximal bracket element 80 has an end 83 and an opposing free end 84. End 83 is considered a proximal extremity of bracket 51 and is disposed inside tailgate and is secured to tailgate 11 with a threaded fastener 85, although a different fastener form can be used, such as a rivet, a sex bolt, etc. Proximal bracket element 80 extends through drainage hole 79 and leads to free end 84, which is disposed beneath lower extremity 15 of tailgate 11 and projects rearwardly. Distal bracket element 81 has an end 90 and an opposing free end 91. End 90 is considered a distal extremity of bracket 51 that is disposed at lower extremity 15 of tailgate 11 outboard of outer face 19 and is secured to lower extremity 25 of billboard 12, and, more particularly, to backing 31, with a threaded fastener 92, although a different fastener form can be used, such as a rivet, a sex bolt, etc. Distal bracket element 81 extends underneath lower extremity 15 of tailgate 11 from end 90 and leads to free end 91, which is disposed beneath lower extremity 15 of tailgate 11 and projects rearwardly and is disposed against free end 84 of proximal bracket element 80. Free ends 84 and 91 are secured together with clip 82, although they can be secured together with a threaded fastener, a rivet, a sex bolt, welding, etc. Because brackets 51 are substantially identical, the foregoing discussion of one brackets 51 applies to each of brackets 51.

In the embodiment set forth in FIG. 1, four brackets 51 are used to secure lower extremity 25 of billboard 12 to lower extremity 15 of tailgate 11. However, less or more brackets 51 can be employed, and only one can be used if desired.

Figure 11:
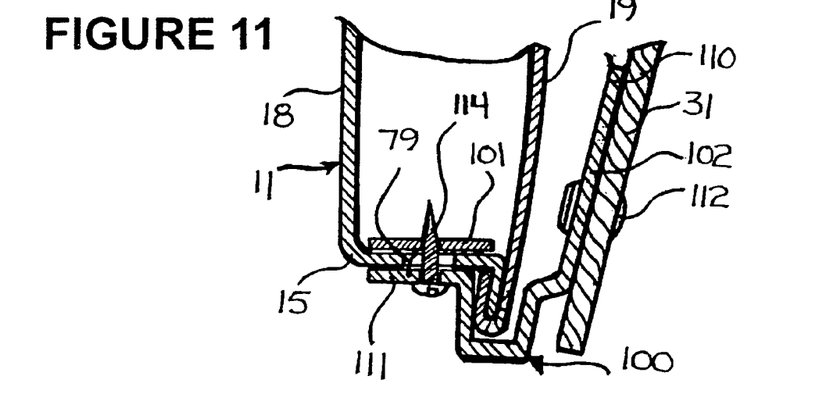
FIG. 11 is an enlarged, vertical sectional view of another embodiment of a bracket for use in attaching a lower extremity of the billboard of FIG. 1 to the tailgate.
Figures 12, 13:
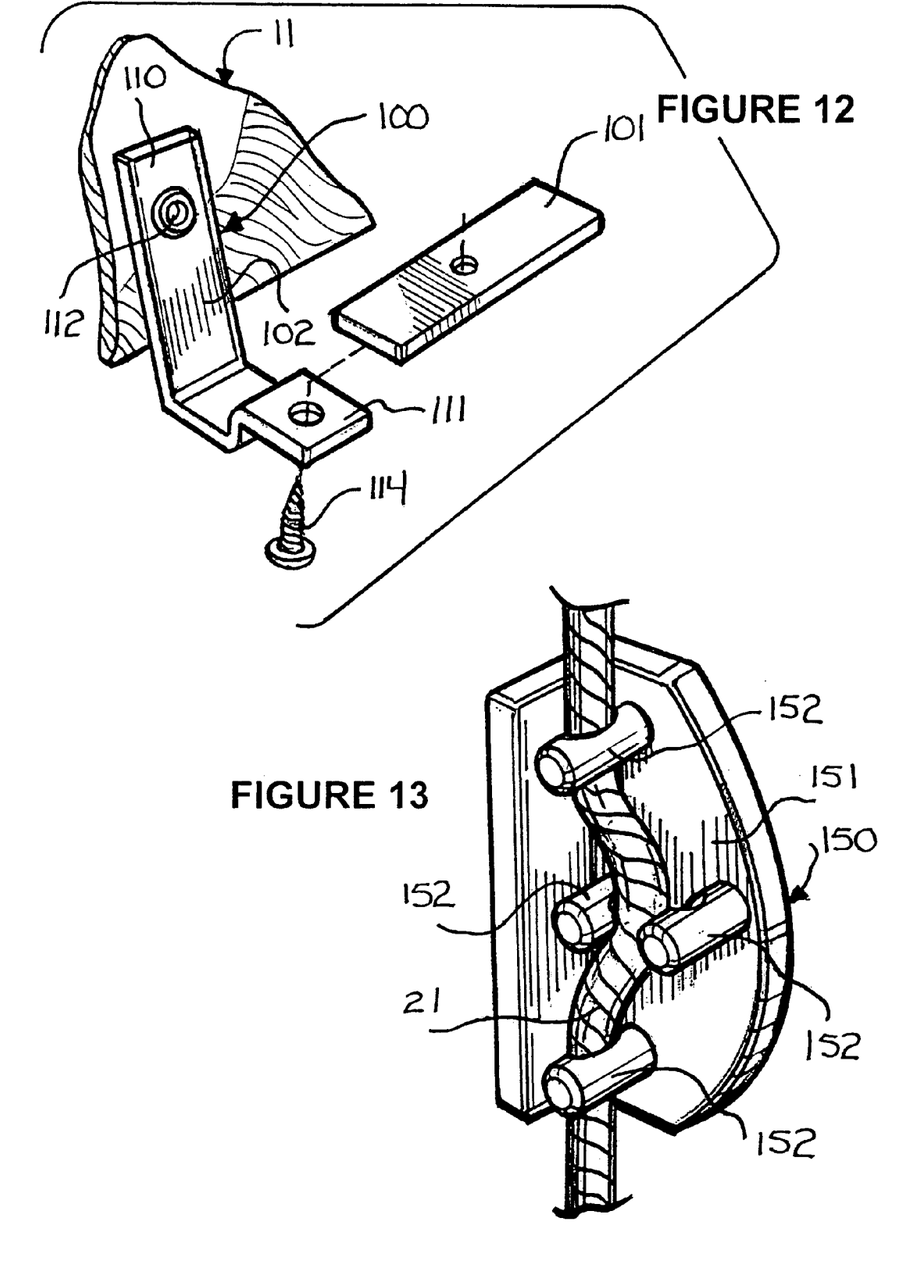
FIG. 12 is a partially exploded perspective view of the bracket embodiment of FIG. 11.
FIG. 13 is a device for taking up slack in a tailgate cable.

Other bracket forms can be used to secure lower extremity 25 of billboard 12 to lower extremity 15 of tailgate 11, and another bracket embodiment is set forth in FIGS. 11 and 12 as a matter of example, which is denoted at 100. Bracket 100 is an assembly, which consists of a proximal bracket element 101, and a distal bracket element 102. Proximal bracket element 101 is elongate, is disposed inside tailgate 11, overlies drainage hole 79 and rests against interior surfaces of tailgate 11. Distal bracket element 102 has an end 110 and an opposing free end 111. End 110 is considered a distal extremity of bracket 100 and free end 111 is considered a proximal extremity of bracket 100. End 110 is disposed at lower extremity 15 of tailgate outboard of outer face 19 and is secured to lower extremity 25 of billboard 12, and, more particularly, to backing 31, with a threaded fastener 112, although a different fastener form can be used, such as a rivet, a sex bolt, etc. Distal bracket element 102 extends underneath lower extremity 15 of tailgate 11 from end 110 and leads to free end 111, which is disposed beneath lower extremity 15 of tailgate 11 opposite drainage hole 79 and projects rearwardly. A threaded fastener 114, disposed through drainage hole 70, secures free end 111 to proximal bracket element 101, although a different fastener form can be used such as a rivet, a sex bolt, welding, etc.

The bracket forms disclosed herein represent preferred bracket embodiments, as they function to exploit the drainage holes of tailgate 11 and are easily installed without the need to drill holes through portions of tailgate 11. Other ways of securing lower extremity 25 of billboard 12 to lower extremity 15 of tailgate 11 can be used, including other bracket forms, without departing from the invention. Billboard 12 can also be secured to side extremities 16, 17 of tailgate 11 with any suitable bracket form.

When billboard 12 is attached to tailgate 11 with fixture 50 and brackets, such as brackets 51 or brackets 100 or by way of other bracket forms, as described herein, tailgate latch handle 20, which is depicted only in FIG. 2, is obstructed and inaccessible. To permit tailgate latch handle 20 to be used for opening tailgate 11, a fixture handle 120 is provided, which has an outer end 121 and an inner end 122 pivoted to an attached support 123 of fixture 50 by way of a conventional pivoting joint 124. Support 123 is formed with and considered part of fixture 50, and projects upwardly therefrom and functions as the supporting structure for fixture handle 120. Fixture handle 120 is disposed centrally between ends 61, 62 of fixture 50 above tailgate latch handle 20.

Fixture handle 120 is coupled to tailgate latch handle 20 with an attachment element, in which tailgate latch handle 20 pivots in response to pivoting of fixture handle 120, allowing tailgate 11 to be opened and closed in the normal fashion. In other words, the attachment element that couples fixture handle 120 to tailgate latch handle 20 transfers pivotal movement of fixture handle 120 to tailgate latch handle 20, so that tailgate latch handle 20 can be operated via fixture handle 120. In the embodiment set forth in FIG. 2, a cord 130 functions as the attachment element to couple fixture handle 120 to tailgate latch handle 20, in which cord 130 has an end 131 secured to outer end 121 of fixture handle 120 and an opposing end 132 secured to the tailgate latch handle 22. End 131 is secured to outer end 121 of fixture handle 120 in any conventional manner, such as with welding, adhesive, with one or more staples, with one or more screws, etc. End 132 can be secured to tailgate latch handle 22 in any conventional manner as with end 131 to outer end 121 of fixture handle 120. In the immediate embodiment, end 132 is secured to tailgate latch handle 22 with a hook/clip 133, which is affixed to end 132 and detachably engaged to tailgate latch handle 20. Cord 130, which is fashioned of braided metal or fibrous strands, passes through a cavity 134 passing through support 123 and through other portions of fixture 50, in which a portion of cord 130 intermediate ends 131, 132 is threaded over pulleys 135 attached and rotated, in a conventional manner, to support 123 interiorly at cavity 134. Pulleys 135 function to direct and orient cord 130 so that it is able to function in accordance with its intended purpose, namely, to function as a coupling between fixture handle 120 and tailgate latch handle. Although two pulleys 135 are disclosed, less or more can be used. Although desirable, pulleys 135 can be omitted, if desired. The cord arrangement disclosed herein is preferred for coupling fixture handle 120 to tailgate latch handle 20 as it represents a simple, inexpensive and efficient structural arrangement. Consistent with this disclosure, fixture handle 120 can be coupled to tailgate latch handle 20 in other ways so as to cause tailgate latch handle 20 to pivot in response to pivoting of fixture handle 120.

The provision of fixture 50 and one or more brackets disclosed herein as the structural combination for securing billboard 12 to tailgate 11 represents a simple and effective and exemplary arrangement for securing billboard 12 to tailgate 11, in accordance with the principle of the invention. Billboard 12 can be secured to tailgate 11 in other ways, if so desired, so as to be arranged and disposed with tailgate 11 in the manner described in this specification. For instance, side extremities 26, 27 of billboard 12 can be secured to side extremities 16, 17 of tailgate 11, such as with brackets or straps or screws or with other fastener types. Billboard 12 can be secured to tailgate 11 at only its upper extremity 24, such as with fixture 50 or with one or more brackets or fasteners, etc. Billboard 12 can also be secured to tailgate 11 at only its lower extremity 25, such as with brackets 51 and/or brackets 100 or other bracket forms, or perhaps with screws and/or other fastener forms. Although it is preferred that the attachment of billboard 12 to tailgate occur at or adjacent its outer extremities, namely its upper and lower extremities 24, 25 and its opposing side extremities 26, 27, the attachment between billboard 12 and tailgate 11 can be made at other locations along the physical extent of billboard 12.

The present invention is described above with reference to a preferred embodiment. However, those skilled in the art will recognize that changes and modifications may be made in the described embodiment without departing from the nature and scope of the present invention. For instance, any billboard form can be used with the invention in accordance with the teachings set forth in this specification, whether billboard assemblies such as with the preferred billboard embodiment disclosed herein, or a single billboard element, such as a sheet of material having advertisement indicia applied thereto. Furthermore, depicted in FIG. 1 is pole 140 having a proximal end 141 engaged to fixture 50 and a distal end 142 having a flag 143 attached thereto. Proximal end 141 extends through, and is secured by, a hole 144 (see also FIG. 8) extending through body 60 of fixture 50 adjacent end 61. Pole 140 can be attached to fixture 50 at other locations and in other ways such as by threaded attachment or other selected male/female engagement structure, etc. The provision of the attachment of flag 143 to fixture 50 with pole 140 is desirable as it provides a desired decorative effect and functions to spark attention in onlookers so as to draw attention to the advertisement indicia of billboard 12. Flag 143 can be furnished with advertisement indicia, if desired.

Turning to FIG. 13, a device 150 is illustrated for taking up slack in a tailgate cable, such as tailgate cable 21 in FIGS. 1 and 2, for accommodating the stretch that normally occurs over time in tailgate cables. Device 150 consists of variously positioned pins 152, which are carried by a support element 151 that is to be attached at the side extremity of a tailgate, such as side extremity 16 of tailgate 11 in FIG. 1. After device is attached, such as by one or more fasteners or by way of welding, etc., tailgate cable 21 is taken up and threaded through pins 152 as in FIG. 13, so as to take up portions of tailgate cable 21.

Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus comprising:
    a tailgate for attachment to a rear of a vehicle so as to be moved between a closed position and an open position as for loading and unloading, the tailgate having an upper extremity, a lower extremity, opposing side extremities, an inner face, and an outer face;
    a fixture having a proximal extremity engaged to the upper extremity of the tailgate and a distal extremity adapted to be engaged to a billboard;
    a tailgate latch handle pivoted to the tailgate;
    a fixture handle pivoted to the fixture; and
    the fixture handle coupled to the tailgate latch handle in which the tailgate latch handle pivots in response to pivoting of the fixture handle.

2. Apparatus of claim 1, further comprising the billboard, overlying the outer face of the tailgate, engaged to the distal extremity of the fixture.

3. Apparatus of claim 2, further comprising at least one bracket having a proximal extremity engaged to the lower extremity of the tailgate and a distal extremity engaged to the billboard.

4. Apparatus of claim 2, wherein the billboard overlies substantially all of the outer face of the tailgate.

5. Apparatus of claim 1, wherein the billboard comprises a media insert captured by and between a rigid backing and a transparent cover.

6. Apparatus of claim 5, wherein the rigid backing and the transparent cover are substantially coextensive defining a perimeter having a frame attached thereto.

7. Apparatus of claim 1, wherein the fixture handle is coupled to the tailgate latch handle with a cord having a first end engaged to the fixture handle and a second end engaged to the tailgate latch handle.

8. Apparatus of claim 7, further comprising a portion of the cord intermediate the first and second ends thereof threaded over at least one attached pulley.

9. Apparatus of claim 1, further comprising a pole having a proximal end engaged to the first engagement structure and a distal end having a flag attached thereto.

* * * * *